(12) United States Patent
Yoshimura et al.

(10) Patent No.: US 6,365,223 B1
(45) Date of Patent: Apr. 2, 2002

(54) PROCESS FOR TINTING A RESIN FOR OPTICAL MATERIALS

(75) Inventors: Yuichi Yoshimura, Chiba-ken; Motoharu Takeuchi; Atsuki Niimi, both of Tokyo; Hiroshi Horikoshi; Masaaki Takasuka, both of Chiba-ken, all of (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/493,100

(22) Filed: Jan. 28, 2000

(30) Foreign Application Priority Data

Jan. 29, 1999 (JP) .............................. 11-022199
Mar. 30, 1999 (JP) .......................... 11-088614

(51) Int. Cl.⁷ ............................. B05D 1/18; B05D 3/10; B05D 5/06; D06P 3/00
(52) U.S. Cl. .................... 427/164; 427/322; 427/430.1; 8/507
(58) Field of Search ................................ 427/164, 322, 427/430.1; 8/507, 508, 509, 510, 511, 512, 513, 514, 515, 516

(56) References Cited

U.S. PATENT DOCUMENTS

| | | | |
|---|---|---|---|
| 3,880,580 A | * 4/1975 | Horowitz et al. | ................... 8/4 |
| 4,401,718 A | 8/1983 | Medford | |
| 4,632,055 A | * 12/1986 | Ryder et al. | ................. 118/703 |
| 4,921,497 A | 5/1990 | Sulc et al. | |
| 5,945,504 A | * 8/1999 | Amagi et al. | ................. 528/373 |
| 6,197,226 B1 | * 3/2001 | Amagai et al. | ............... 264/1.1 |

FOREIGN PATENT DOCUMENTS

| | | |
|---|---|---|
| EP | 0031633 A2 | 7/1981 |
| EP | 0031633 A3 | 7/1981 |
| EP | 0272101 A3 | 6/1988 |
| EP | 0272101 A2 | 6/1988 |
| EP | 0382477 A1 | 8/1990 |
| EP | 0785194 A1 | 7/1997 |
| EP | 0928802 A2 | 7/1999 |

* cited by examiner

Primary Examiner—Michael Barr
(74) Attorney, Agent, or Firm—Antonelli, Terry, Stout & Kraus, LLP

(57) ABSTRACT

A process for tinting a resin for optical materials, the resin containing sulfur, includes dipping the resin for optical materials into a liquid containing an inorganic acid and/or an organic acid and thereafter tinting the resin. Where the organic acid is included in the liquid, the organic acid is a mixture of a first compound (I) having sulfo group and a second compound (II) having phenolic hydroxyl group but not having sulfo group, with a ratio (I)/(II) of the first compound to the second compound, in an amount by weight, being 0.01 to 2.0.

4 Claims, No Drawings

PROCESS FOR TINTING A RESIN FOR OPTICAL MATERIALS

BACKGROUND OF THE INVENTION

1. Field of the Invention

The present invention relates to a process for tinting a resin for optical materials such as plastic lenses, prisms, optical fibers, information recording substrates and filters, and more particularly to a process for tinting a resin for plastic lenses for glasses.

2. Description of the Prior Art

Plastic materials have widely been used as various optical materials, particularly as lenses of glasses, because of light weight, toughness and easiness of tinting. The properties required for optical materials, particularly for lenses of glasses, are a low specific gravity, optical properties such as a large refractive index and a large Abbe number and physical properties such as high heat resistance and large strength. A large refractive index is important to decrease thickness of a lens. A large Abbe number is important to decrease chromatic aberration of a lens. High heat resistance and large strength are important to facilitate fabrication and also from the standpoint of safety.

However, since plastic materials have smaller refractive indices than those of inorganic lenses, it is necessary that the thickness of plastic lenses be increased. This causes problems in that light weight which is the characteristic property of plastic materials cannot be effectively utilized and that appearance becomes poor. Therefore, development of a resin for optical materials having a larger refractive index has been desired.

As the material having a large refractive index in accordance with conventional technology, resins containing sulfur such as thermosetting optical materials having a thiourethane structure which are obtained by the reaction of polythiol compounds and polyisocyanate compounds (Japanese Patent Application Publication No. Heisei 4(1992)-58489 and Japanese Patent Application Laid-Open No. Heisei 5(1993)-148340) and materials obtained by using 1,4-dithiane-2,5-dimercaptomethyl (Japanese Patent Application Publication Heisei 6(1994)-5323) have been proposed.

A small chromatic aberration is another important property required for an optical material. The larger the Abbe number, the smaller the chromatic aberration. Therefore, a material having a large Abbe number is desirable. Thus, a material having a large refractive index and a large Abbe number is desired. However, the Abbe number tends to decrease with an increase in the refractive index. Plastic materials obtained from conventional compounds have the maximum Abbe number of about 50 to 55 when the refractive index is 1.50 to 1.55, about 40 when the refractive index is 1.60 and about 31 when the refractive index is 1.66. When the refractive index is forced to increase to 1.70, the Abbe number decreases to 30 or less and the obtained material cannot practically be used. To overcome these problems, the present inventors discovered novel sulfur-containing compounds having an episulfide structure from which optical materials having a small thickness and a decreased chromatic aberration, i.e., a refractive index of 1.70 or more and an Abbe number of 35 or more, can be obtained (Japanese Patent Application Laid Open Nos. Heisei 9(1997)-71580, Heisei 9(1997)-110979 and Heisei 9(1997)-255781 and Japanese Patent Application No. Heisei 11(1999)-022199).

As the refractive index is increased, it has become essential that sulfur is incorporated into a resin for optical materials and the sulfur content has been increasing with the increase in the refractive index. Diethyleneglycol bisallyl carbonate (hereinafter, abbreviated as CR-39) is known as a material having the refractive index of 1.50. This material does not contain sulfur. On the other hand, materials having a refractive index of 1.60 or more and an Abbe number of 40 or more contain about 25 to 30% of sulfur. The materials discovered by the present inventors which can achieve both of a large refractive index and a large Abbe number, i.e., a refractive index of 1.70 or more and an Abbe number of 35 or more, contain 50% or more of sulfur.

Due to the increased refractive index described above, the thickness of lenses prepared from the above materials can be made smaller than those of lenses prepared from CR-39 and the thickness of the entire lens can be decreased. Thus, the light weight which is the characteristic property of plastic materials can be advantageously utilized and the appearance can be improved.

Plastic materials have another drawback in that tinting is difficult. CR-30 can be satisfactorily tinted by dipping into an aqueous solution of a disperse dye. On the other hand, the above materials having large refractive indices have a drawback in that these materials have the hydrophobic property (small absorption of water) due to the characteristic structure containing a large amount of sulfur and cannot be tinted satisfactorily in accordance with the conventional method of dipping into an aqueous solution of a disperse dye. Improvement in the conventional method of tinting, for example, by addition of various carriers such as aromatic compounds, phenol compounds, alcohols, carboxylic acids and esters of carboxylic acids or various surfactants to the aqueous solution of a disperse dye has not achieved a sufficient effect. As described above, tinting of resins containing sulfur is difficult and this difficulty is enhanced as the sulfur content increases due to the enhanced hydrophobic property. Therefore, development of a novel process for tinting a resin for optical materials has been desired.

SUMMARY OF THE INVENTION

An object of the present invention is to develop a process for tinting a resin for optical materials, particularly a resin containing sulfur which shows increased difficulty in tinting as the refractive index increases and to obtain a resin for optical materials which has a large refractive index and exhibits excellent tint performance, which heretofore cannot be achieved.

As the result of intensive studies by the present inventors to overcome the above problems, it was found that the problems can be overcome by the process described in the following. The present invention has been completed based on this knowledge.

The present invention provides a process for tinting a resin for optical materials which comprises dipping a resin for optical materials into a liquid comprising an inorganic acid and/or an organic acid and thereafter tinting the resin, wherein the organic acid is a mixture of compound (I) having sulfo group and compound (II) having phenolic hydroxyl group but not having sulfo group and a ratio [(I)/(II)] of an amount by weight of compound (I) to an amount by weight of compound (II) is 0.01 to 2.0.

The present invention also provides a resin for optical materials which is tinted in accordance with the above process.

DETAILED DESCRIPTION OF THE INVENTION

In accordance with the process of the present invention, a resin for optical materials, particularly a resin containing sulfur which has a larger refractivity index and shows difficulty in tinting, can be tinted by dipping the resin into an inorganic acid and/or an organic acid and tinting the resin thereafter.

The resin for optical materials used in the present invention is not particularly limited and may be various resins such as (meth)acrylic resins, ester resins, carbonate resins, olefinic resins, epoxy resins, unsaturated polyester resins, urethane resins, thiourethane resins, polystyrene, copolymers of styrene, polyvinyl chloride, polyethylene terephthalate, diethylene glycol bisallylcarbonate polymers and copolymers of tetrabromobisphenol A dimethacrylate and styrene. The process is advantageously applied to resins containing sulfur and more advantageously to resins containing large amounts of sulfur.

Examples of the resin containing sulfur include resins obtained by curing by polymerization of a compound having one or more structures represented by the following formula (1) in one molecule or a composition comprising this compound.

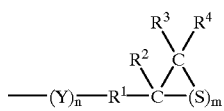

(1)

In the above formula, $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents S or O, m represents a number of 1 to 5 and n represents a number of 0 to 5.

The resin containing sulfur in the present invention is a resin which contains sulfur atom. The larger the sulfur content in the resin containing sulfur, the more remarkable the effect of the present invention. The sulfur content is a content by weight of sulfur in the total weight of the resin. In particular, the effect of the present invention is remarkably exhibited when the resin containing sulfur has a sulfur content of 30% or more.

The composition comprising the compound having one or more structures represented by formula (1) used in the present invention is a composition comprising the compound having one or more structures represented by formula (1) in an amount of 1% by weight, preferably 5% by weight and more preferably 10% by weight.

In order that the optical material prepared from the resin exhibits a large refractive index and a large Abbe number in an excellent balance, it is preferable that $R^1$ in formula (1) represents methylene group or ethylene group and $R^2$, $R^3$ and $R^4$ each represents hydrogen atom or methyl group. It is more preferable that $R^1$ represents methylene group and $R^2$, $R^3$ and $R^4$ each represents hydrogen atom. It is preferable that n represents 0 or 1. It is also preferable that m represents 1.

Examples of the compound having the structure represented by formula (1) include the following compounds:
  (A) Organic compounds having one or more epithio groups
  (B) Organic compounds having one or more epithioalkyloxy groups
  (C) Organic compounds having one or more epithioalkylthio groups
  Organic compounds (A), (B) and (C) have a chain backbone structure, an alicyclic backbone structure, an aromatic backbone structure or a heterocyclic backbone structure having nitrogen atom, oxygen atom or sulfur atom. The organic compounds may have a combination of epithio group, epithioalkyloxy groups and epithioalkylthio groups in one molecule. The organic compound may also have sulfide linkages, ether linkages, sulfone linkages, ketone linkages, ester linkages, amide linkages or urethane linkages.

Preferable examples of the organic compounds having epithio groups of compound (A) include compounds obtained by replacing one or more epoxy groups in compounds having epoxy groups (not glycidyl groups) with epithio groups. Specific examples of the above compounds include:

Organic compounds having a chain aliphatic backbone structure such as 1,1-bis(epithioethyl)methane, 1-(epithioethyl)-1-(β-epithiopropyl)methane, 1,1-bis(β-epithiopropyl)methane, 1-(epithioethyl)-1-(β-epithiopropyl)ethane, 1,2-bis(β-epithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutylthio)ethane, 1-(epithioethyl)-2-[2-(γ-epithiobutylthio)ethylthio]ethane, tetrakis-(β-epithiopropyl)methane, 1,1,1-tris(β-epithiopropyl)propane, 1,3-bis(β-epithiopropyl)-1-(β-epithiopropyl)-2-thiapropane and 1,5-bis(β-epithiopropyl)-2,4-bis(β-epithiopropyl)-3-thiapentane;

Compounds having an alicyclic backbone structure such as 1,3- and 1,4-bis(epithioethyl)cyclohexanes, 1,3- and 1,4-bis(β-epithiopropyl)cyclohexanes, bis[4-(epithioethyl)cyclohexyl]methane, bis[4-(β-epithiopropyl)cyclohexyl]methane, 2,2-bis[4-(epithioethyl)cyclohexyl]propane, 2,2-bis[4-(β-epithiopropyl)cyclohexyl]propane, bis[4-(β-epithiopropyl)cyclohexyl]sulfide, bis[4-(epithioethyl)cyclohexyl]sulfide, 2,5-bis(epithioethyl)-1,4-dithiane, 2,5-bis(β-epithiopropyl)-1,4-dithiane, 4-epithioethyl-1,2-cyclohexene sulfide and 4-epoxy-1,2-cyclohexene sulfide;

Compounds having an aromatic backbone structure such as 1,3- and 1,4-bis(epithioethyl)benzenes, 1,3- and 1,4-bis(β-epithiopropyl)benzenes, bis[4-(epithioethyl)phenyl]methane, bis[4-(β-epithiopropyl)phenyl]methane, 2,2-bis[4-(epithioethyl)phenyl]propane, 2,2-bis[4-(β-epithiopropyl)phenyl]propane, bis[4-(epithioethyl)phenyl]sulfide, bis[4-(β-epithiopropyl)phenyl]sulfide, bis[4-(epithioethyl)phenyl]sulfone, bis[4-(β-epithiopropyl)phenyl]sulfone, 4,4'-bis(epithioethyl)biphenyl and 4,4'-bis(β-epithiopropyl)biphenyl and the like compounds; and Compounds obtained by replacing at least one hydrogen atom of the epithio group with methyl group.

Preferable examples of the organic compounds having one or more epithioalkyloxy groups of compound (B) include compounds obtained by replacing one or more glycidyl groups in epoxy compounds derived from an epihalohydrin with epithioalkyloxy groups (thioglycidyl groups). Specific examples of the above epoxy compounds include epoxy compounds derived from phenols which are produced by condensation of epihalohydrins with polyhydric phenols such as hydroquinone, catechol, resorcinol, bisphenol A, bisphenol F, bisphenol sulfone, bisphenol ether, bisphenol sulfide, halogenated bisphenol A and novolak resins; epoxy compounds derived from alcohols which are produced by condensation of epihalohydrins with polyhydric alcohols such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- and 1,4-cyclohexanediols, 1,3- and 1,4-cyclohexanedimethanols, hydrogenated bisphenol A, adducts of ethylene oxide and bisphenol A and adducts of propylene oxide and bisphenol A; epoxy compounds of glycidyl esters which are produced by condensation of epihalohydrins with polybasic carboxylic acid compounds such as adipic acid, sebacic acid, dodecanedicarboxylic acid, dimer acid, phthalic acid, isophthalic acid, terephthalic acid, tetrahydrophthalic acid, methyltetrahydrophthalic acid, hexahydrophthalic acid, hexahydro-isophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid; epoxy compounds derived from amines which are produced by condensation of epihalohydrins with primary diamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl)ether, 1,2-bis(3-aminopropoxy)ethane, 1,3-bis(3-aminopropoxy)-2,2'-dimethylpropane, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, isophoronediamine, 1,4-bisaminopropylpiperadine, m- and p-phenylenediamines, 2,4- and 2,6-tolylenediamines, m- and p-xylylenediamines, 1,5- and 2,6-naphthalenediamines, 4,4'-diaminodiphenylmethane, 4,4'-diaminodiphenyl ether and 2,2-(4,4'-diaminodiphenyl)propane; epoxy compounds derived from amines which are produced by condensation of epihalohydrins with secondary diamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperadyl)methane, 1,2-di(4-piperidyl)ethane, 1,3-di(4-piperidyl)propane and 1,4-di(4-piperidyl)butane; and epoxy compounds of urethane produced from the above polyhydric alcohols, the above phenols, diisocyanates and glycidol.

More specific examples of compound (B) include:

Compounds having a chain aliphatic backbone structure such as bis(β-epithiopropyl)ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxymethyl)propane, 1,4-bis(β-epithiopropyloxy)butane, 1,3-bis(β-epithiopropyloxy)butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β-epithiopropyloxyethyl)oxyethyl]oxy]ethane, tetrakis(β-epithiopropyloxymethyl)methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis(β-epithiopropyloxymethyl)-3,6-dithiaoctane, 1,8-bis(β-epithiopropyloxy )-2,4,5-tris(β-epithiopropyloxymethyl)-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2-β-epithiopropyloxyethyl)oxymethyl]-3,7-dithianonane, 1,10-bis(β-epithiopropyloxy)-5,6-bis[(2-β-epithiopropyloxyethyl)oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)oxymethyl]-3,6,9-trithiaundecane and 1,11-bis(β-epithiopropyloxy)4,7-bis(β-epithiopropyloxymethyl)-3,6,9-trithiaundecane;

Compounds having an alicyclic backbone structure such as 1,3- and 1,4-bis(β-epithiopropyloxy)cyclohexanes, 1,3- and 1,4-bis(β-epithiopropyloxymethyl)cyclohexanes, bis[4-(β-epithiopropyloxy)cyclohexyl]methane, 2,2-bis[4-(β-epithiopropyloxy)cyclohexyl]propane, bis[4-(β-epithiopropyloxy)cyclohexyl]sulfide, 2,5-bis(β-epithiopropyloxymethyl)-1,4-dithiane and 2,5-bis(β-epithiopropyloxyethyloxymethyl)-1,4-dithiane;

Compounds having an aromatic backbone structure such as 1,3- and 1,4-bis(β-epithiopropyloxy)benzenes, 1,3- and 1,4-bis(β-epithiopropyloxymethyl)benzenes, bis[4-(β-epithiopropyloxy)phenyl]methane, 2,2-bis[4-(β-epithiopropyloxy)phenyl]propane, bis[4-(β-epithiopropyloxy)phenyl]sulfide, bis[4-(β-epithiopropyloxy)phenyl]sulfone and 4,4'-bis(β-epithiopropyloxy)biphenyl; and Compounds obtained by replacing at least one hydrogen atom in the epithio group of the above compounds with methyl group.

Preferable examples of the organic compounds having one or more epithioalkylthio groups of compound (C) include compounds obtained by replacing one or more epoxyalkylthio groups (specifically, β-epoxypropylthio groups) in epoxy compounds derived from a compound having mercapto group and an epihalohydrin with epithioalkylthio groups.

Specific examples of the above compounds include:

Organic compounds having a chain aliphatic backbone structure such as bis(β-epithiopropyl)sulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β- epithiopropylthio)butane, 1-(β-epithiopropylthio)-3-(β-epithiopropylthiomethyl)-butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl)thioethyl]thio]ethane; tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis[(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane and 1,11-bis(β-epithiopropylthio)-4,7-bis(β-epithiopropylthiomethyl)-3,6,9-trithiaundecane;

Chain compounds having an ester group and an epithioalkylthio group such as tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane and 1,1,1-tri[2-(β-epithiopropylthiomethyl)acetylmethyl]propane;

Compounds having an alicyclic backbone structure such as 1,3- and 1,4-bis(β-epithiopropylthio)cyclohexanes, 1,3- and 1,4-bis(β-epithiopropylthiomethyl)cyclohexanes, bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide, 2,5-bis(β-epithiopropylthiomethyl)-1,4-dithiane and 2,5-bis(β-epithiopropylthioethylthiomethyl)-1,4-dithiane;

Compounds having an aromatic backbone structure such as 1,3- and 1,4-bis(β-epithiopropylthio)benzenes, 1,3- and 1,4-bis(β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone and 4,4'-bis(β-epithiopropylthio)biphenyl; and Compounds obtained by replacing at least one hydrogen atom in the β-epithiopropyl group of the above compounds with methyl group.

Further examples of compounds (A) to (C) include organic compounds having unsaturated groups. Specific examples of such compounds include vinylphenyl thioglycidyl ether, vinylbenzyl thioglycidyl ether, thioglycidyl methacrylate, thioglycidyl acrylate and allyl thioglycidyl ether.

Further examples of the compounds having one or more epithio groups include compounds such as ethylene sulfide, propylene sulfide and thioglycidol; thioglycidyl esters of monocarboxylic acids such as acetic acid, propionic acid and benzoic acid; and thioglycidyl ethers such as methyl thioglycidyl ether, ethyl thioglycidyl ether, propyl thioglycidyl ether and butyl thioglycidyl ether.

Among the above compounds, the organic compounds having one or more epithioalkyloxy groups of compound (B) and the organic compounds having one or more epithioalkylthio groups of compound (C) are preferable for optical materials. The compounds having one or more epithioalkylthio groups of compound (C) are more preferable. Examples of still more preferable compounds include bis(β-epithiopropyl)sulfide and chain compounds, branched compounds, alicyclic compounds and aromatic compounds having β-epithioalkylthio groups which are described above as the examples.

Examples of the resin containing sulfur also include resins obtained by curing by polymerization of a compound having one or more structures represented by the following formula (1') in one molecule or a composition comprising this compound.

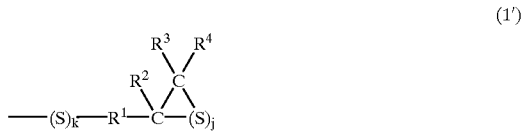

(1')

In the above formula, $R^1$ represents a hydrocarbon group having 1 to 10 carbon atoms, $R^2$, $R^3$ and $R^4$ each represents hydrogen atom or a hydrocarbon group having 1 to 10 carbon atoms, j represents a number of 1 to 5, k represents a number of 0 to 5, j+k represents a number of 2 or larger and j and k do not represent 1 simultaneously.

In order that an optical material prepared from the resin exhibits a large refractive index and a large Abbe number in an excellent balance, it is preferable that $R^1$ in formula (1') represents methylene group or ethylene group and $R^2$, $R^3$ and $R^4$ each represents hydrogen atom or methyl group. It is more preferable that $R^1$ represents methylene group and $R^2$, $R^3$ and $R^4$ each represents hydrogen atom. j represents a number of 1 to 5 and preferably 1 or 2. k represents a number of 0 to 5 and preferably a number of 1 to 4. When j and k represent 1 simultaneously, a sufficiently large refractive index cannot be obtained.

The episulfide compound having one or more structures represented by formula (1') of the present invention may be any organic compound satisfying the above condition. Preferable examples of such compounds include: bis(β-epithiopropyl)disulfide, bis(β-epithiopropyl)trisulfide, bis(β-epithiopropyl)tetrasulfide, bis(β-epithiopropylthioethyl)disulfide, bis(β-epithiopropylthioethyl)trisulfide, bis(β-epidithiopropyl)sulfide, bis(β-epidithiopropyl)disulfide, bis(β-epidithiopropyl)trisulfide, 1,2,3-tris(β-epithiopropyldithio)propane, 1,2,3-tris(β-epidithiopropylthio)propane, tris(β-epidithiopropylthiomethyl)methane, 1,1,1-tri(β-epidithiopropylthiomethyl)propane, tetrakis(β-epithiopropyldithiomethyl)methane, tetrakis(β-epidithiopropylthiomethyl)methane, tetrakis(β-epidithiopropyldithiomethyl)methane, bis[1,3-bis(β-epithiopropylthio)propyl]disulfide, 1,3- and 1,4-bis(β- epidithiopropylthio)cyclohexanes, bis[4-(β-epidithiopropylthio)cyclohexyl]sulfide, bis[4-(β-epidithiopropylthio)cyclohexyl]disulfide, bis[4-(β-epidithiopropylthio)cyclohexyl]methane, 2,2-bis[4-(β-epidithiopropylthio)cyclohexyl]propane, 2,5-bis(β-epithiopropyldithiomethyl)-1,4-dithiane, 2,5-bis(β-epidithiopropylthio)-1,4-dithiane, 2,5-bis(β-epidithiopropylthiomethyl)-1,4-dithiane, 1,3- and 1,4-bis(β-epidithiopropylthio)benzenes, 1,3- and 1,4-bis(β-epidithiopropylthiomethyl)benzenes, bis[4-(β-epidithiopropylthio)phenyl]sulfide, bis[4-(β-epidithiopropylthio)phenyl]disulfide, bis[4-(β-epidithiopropylthio)phenyl]methane, 2,2-bis[4-(β-epidithiopropylthio)phenyl]propane, bis[4-(β-epidithiopropylthio)phenyl]sulfone, 4,4'-bis(β-epidithiopropylthio)biphenyl, vinyl thioglycidyl disulfide, allyl thioglycidyl sulfide, vinylphenyl thioglycidyl disulfide and vinylbenzyl thioglycidyl disulfide. Compounds obtained by replacing at least one hydrogen atom of the β-epi(di)thiopropyl(poly)thio group with methyl group are also included in the examples.

Further examples of the compounds having one epithio group include compounds such as ethylene disulfide, propylene disulfide and dithioglycidol; dithioglycidyl esters of monocarboxylic acids such as acetic acid, propionic acid and benzoic acid; and thioglycidyl disulfides such as methyl thioglycidyl disulfide, ethyl thioglycidyl disulfide, propyl thioglycidyl disulfide and butyl thioglycidyl disulfide.

Among the above compounds, compounds having one or more β-epidithiopropyl groups in one molecule and compounds having one or more β-epidithiopropylpolythio groups in one molecule are preferable.

Compounds represented by the following formula (2) is more preferable:

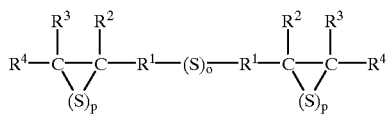

(2)

In the above formula, $R^1$ represents a hydrocarbon group having 1 to 10 carbon atoms, $R^2$, $R^3$ and $R^4$ each represents hydrogen atom or a hydrocarbon group having 1 to 10 carbon atoms, o represents a number of 1 to 5, p represents a number of 1 to 5, o+p represents a number of 3 or more and o and p do not represent 1 simultaneously.

Specific examples of the above compounds include: bis(β-epithiopropyl)disulfide, bis(β-epithiopropyl)trisulfide, bis(β-epidithiopropyl)sulfide, bis(β-epidithiopropyl)disulfide, bis(β-epidithiopropyl)trisulfide, bis[1,3-bis(β-epithiopropylthio)propyl]disulfide, 1,2,3-tris(β-epithiopropyldithio)propane, tris(β-epidithiopropylthiomethyl)methane, 1,1,1-tri(β-epidithiopropylthiomethyl)propane, tetrakis(β-epidithiopropyldithiomethyl)methane, 2,5-bis(β-epithiopropyldithiomethyl)-1,4-dithiane, 2,5-bis(β-epidithiopropylthio)-1,4-dithiane and 2,5-bis(β-epidithiopropylthiomethyl)-1,4-dithiane.

In the present invention, dipping a resin for optical materials into an inorganic acid and/or an organic acid means dipping the resin for optical materials into an inorganic acid and/or an organic acid or into a liquid containing 0.1% by weight or more of an inorganic acid and/or an organic acid. The concentration of the inorganic acid and/or the organic acid is preferably 1% by weight or more, more preferably 5% or more, still more preferably 10% or more, still more preferably 20% or more and most preferably 30% or more. This treatment of dipping is a pretreatment for tinting and the above liquid is a pretreatment liquid for tinting. To the pretreatment liquid, various dispersants, surfactants, antioxidants, stabilizers and other additives may be added, where necessary.

As the solvent for the pretreatment liquid for tinting, water and/or an organic solvent can be used. The solvent is not particularly limited as long as the solvent dissolves the above acids. Specific examples of the organic solvent include methanol, ethanol, propanol, butanol, isopropyl alcohol, benzyl alcohol, phenetyl alcohol, ethylene glycol, diethylene glycol, triethylene glycol, glycerol, xylylenediol, methylcellosolve, ethylcellosolve, butylcellosolve, ethyl acetate, butyl acetate, tetrahydrofuran, methyltetrahydrofuran, dioxane, diethyl ether, 1,2-dimethoxyethane, acetone, acetonitrile, butanone, benzene, toluene, xylene, naphthalene, dichloromethane, chloroform, carbon tetrachloride, chlorobenzene, N,N-dimethylformamide, dimethylsulfoxide, 2-hydroxyethylamine, 2,2'-iminodiethanol and 2-mercaptoethanol. Any of these solvents may be used singly or in combination of two or more. Among these solvents, methanol, ethanol, benzyl alcohol, ethylene glycol, diethylene glycol, methylcellosolve, ethylcellosolve, toluene, xylene, naphthalene, N,N-dimethylformamide an dimethylsulfoxide are preferable.

However, when the acids contained in the pretreatment liquid for tinting are organic acids alone, the effect of the pretreatment for tinting occasionally decreases in the presence of water. Therefore, it is effective for enhancing the effect of tinting that the pretreatment is conducted in the absence of water when the acids contained in the pretreatment liquid for tinting are organic acids alone.

Specific examples of the inorganic acid used in the present invention include carbonic acid, nitric acid, hydrochloric acid, perchloric acid, hypochlorous acid, chlorine dioxide, hydrofluoric acid, sulfuric acid, fuming sulfuric acid, pyrosulfuric acid, boric acid, arsenic acid, arsenous acid, pyroarsenic acid, phosphoric acid, pyrophosphoric acid, phosphorous acid, hypophosphorous acid, phosphorus oxychloride, phosphorus oxybromide, phosphorus trichloride, phosphorus tribromide, phosphorus pentachloride, cyanic acid, chromic acid, anhydrous nitric acid, anhydrous sulfuric acid, boron oxide, arsenic pentaoxide, phosphorus pentaoxide, anhydrous chromic acid, sulfuryl chloride, silica gel, silica alumina, silicic acids and boron tetrafluoride. Any of the above inorganic acids may be used singly or in combination of two or more. Among these inorganic acids, hydrochloric acid, sulfuric acid, nitric acid and phosphoric acid are preferable.

The organic acid used in the present invention is an organic compound exhibiting the acidic property. Specific examples of the organic acid include compounds having sulfo group, compounds having carboxyl group, compounds having phenolic hydroxyl group, compounds having mercapto group, sulfinic acids, enol type compounds, imides, oximes, aromatic sulfonamides, esters of phosphoric acid and esters of phosphorous acid. Any of the above organic acids may be used singly or in combination of two or more. Among these organic acid, compounds having at least one group selected from sulfo group, carboxyl group and phenolic hydroxyl group are preferable.

Specific examples of the above compounds having sulfo group include methanesulfonic acid, ethanesulfonic acid, butanesulfonic acid, dodecanesulfonic acid, benzenesulfonic acid, o-toluenesulfonic acid, m-toluenesulfonic acid, p-toluenesulfonic acid, ethylbenzenesulfonic acid, butylbenzenesulfonic acid, dodecylbenzenesulfonic acid, o-phenolsulfonic acid, m-phenolsulfonic acid, p-phenolsulfonic acid, o-cresolsulfonic acid, m-cresolsulfonic acid, p-cresol sulfonic acid, metanilic acid, sulfanilic acid, 4B acid, diaminostilbenesulfonic acid, biphenylsulfonic acid, α-naphthalenesulfonic acid, β-naphthalenesulfonic acid, peri acid, Laurent's acid, phenyl-J acid, 4-hydroxy-3-methylbenzenesulfonic acid, α-naphtholsulfonic acid, β-naphtholsulfonic acid and sulfonation products of compounds having phenolic hydroxyl group which will be described later. Any of the above compounds may be used singly or in combination of two or more. Among the above compounds, sulfonic acid compounds having an aromatic ring are preferable. In general, sulfonic acid compounds frequently have crystal water. Particularly excellent effect of the pretreatment for tinting can be exhibited when water is removed by a treatment under heating or a treatment at a reduced pressure.

Specific examples of the above compounds having carboxyl group include formic acid, acetic acid, propionic acid, 2-ethylhexanoic acid, butyric acid, valeric acid, caproic acid, caprylic acid, naphthenic acid, oxalic acid, malonic acid, succinic acid, glutaric acid, adipic acid, maleic acid, cyclohexanecarboxylic acid, benzoic acid, phenylacetic acid, o-toluic acid, m-toluic acid, p-toluic acid, salicylic acid, 2-methoxybenzoic acid, 3-methoxybenzoic acid, benzoylbenzoic acid, phthalic acid, isophthalic acid, terephthalic acid, benzylic acid, α-naphthalenecarboxylic acid, β-naphthalenecarboxylic acid, thiodipropionic acid, dithiodipropionic acid, acetic anhydride, peracetic acid, thioacetic acid, oxalic acid, tartaric acid, salicylic acid, maleic anhydride, benzoic anhydride, phthalic anhydride, trimellitic anhydride and pyromellitic anhydride. Any of the above compounds may be used singly or in combination of two or more. Among these compounds, aromatic carboxylic acids and monobasic aliphatic carboxylic acids are preferable.

The above compounds having phenolic hydroxyl group are compounds which have phenolic hydroxyl group but do not have sulfo group. Specific examples of such compounds include phenol, catechol, resorcinol, hydroquinone, phloroglucinol, pyrogallol, 2-cresol, 3-cresol, 4-cresol, 2-ethylphenol, 4-ethylphenol, 4-propylphenol, 4-butylphenol, 4-(1,1,3,3-tetramethylbutyl)phenol, 4-nonylphenol, 2,4-di-t-butylphenol, 2,6-di-t-butylphenol, 2-t-butyl-4-methylphenol, 2-t-butyl-4,6-dimethylphenol, 2,6-di-t-butyl-4-methylphenol, 2,6-di-t-butyl-4-ethylphenol, 4-methylcatechol, 4-ethylcatechol, 4-propylphenol, 4-t-butylcatechol, 4-(1,1,3,3-tetramethylbutyl)catechol, methylhydroquinone, 2-t-butylhydroquinone, 2,5-di-t-butylhydroquinone, 2,6-di-t-butylhydroquinone, 2,5-di-t-amylhydroquinone, 2,5-di(1,1,3,3-tetramethylbutyl) hydroquinone, 2-methoxyphenol, 4-methoxyphenol, 2,4-dimethoxyphenol, 2,6-dimethoxyphenol, 2,4,6-trimethoxyphenol, 2-t-butyl-4-methoxyphenol, 3-t-butyl-4-methoxyphenol, 3-methoxycatechol, 4-methoxycatechol, 3,5-dimethoxycatechol, 3,6-dimethoxycatechol, catechol-4-carboxylic acid, salicylic acid, methyl salicylate, ethyl salicylate, propyl salicylate, butyl salicylate, octyl salicylate, phenyl salicylate, benzyl salicylate, dimethylsalicylic acid, di-t-butylsalicylic acid, salicylosalicylic acid, salicylamide, sodium salicylate, 4-hydroxybenzoic acid, methyl 4-hydroxybenzoate, ethyl 4-hydroxybenzoate, propyl 4-hydroxybenzoate, butyl 4-hydroxybenzoate, phenyl 4-hydroxybenzoate, benzyl 4-hydroxybenzoate, 2,4-dihydroxybenzophenone, 2-hydroxy-4-methoxybenzophenone, 2-hydroxy-4-ethoxybenzophenone, 2-hydroxy-4-octoxybenzophenone, hydroxyphenylacetic acid, hydroxyphenylpropionic acid, hydroxyphenylacetamide, methyl hydroxypohenylacetate, hydroxyphenetyl alcohol, hydroxyphenetylamine, acetoaminophenone, aminophenol, cyanophenol, nitrophenol, nitrosophenol, 2-mercaptophenol, 4-mercaptophenol, 2,4-dimercaptophenol, 2,6-dimercaptophenol, 2,4,6-trimercaptophenol, 2-fluorophenol, 4-fluorophenol, 2-chlorophenol, 4-chlorophenol, 2,4-dichlorophenol, 2,6-dichlorophenol, 2,4,6-trichlorophenol, 2-bromophenol, 4-bromophenol, 2,4,-dibromophenol, 2,6-dibromophenol, 2,4,6-tribromophenol, 2-iodophenol, 4-iodophenol, hydroxyphenetylamine, hydroxybenzaldehyde, 2-phenylphenol, 3-phenylphenol, 4-phenylpohenol, 2,2'-biphenol, 4,4'-biphenol, bisphenol A, bisphenol F, bisphenol S, bis(4-hydroxyphenyl)sulfide, bis (3,5-dimethyl-4-hydroxyphenyl)sulfide, 1-naphthol, 2-naphthol, dihydroxynaphthalenes, octadecyl-3-(3,5-di-t-butyl-4-hydroxyphenyl)propionate, 2,2'-methylenebis(4-methyl-6-t-butylphenol), 2,2'-methylenebis(4-ethyl-6-t-butylphenol), 2,2'-methylenebis(2,6-di-t-butylpohenol), 4,4'-butylidenbis(3-methyl-6-t-butylphenol), 4,4'-thiobis(3-methyl-6-t-butylphenol), 1,1,3-tris(2-methyl-4-hydroxy-5-t-butylphenyl)butane, 1,3,5-trimethyl-2,4,6-tris(3, 5-di-t-butyl-4-hydroxybenzyl)benzene, 2-t-butyl-6-(3'-t-butyl-5'-methyl-2'-hydroxybenzyl)-4-methylphenyl acrylate and 2,4-bis(n-octylthio)-6-(4-hydroxy-3,5-di-t-butylanilino)-1,3,5-triazine. Any of the above compounds may be used singly or in combination of two or more. Among these compounds, monohydric phenols and dihydric phenols are preferable and phenol, chlorophenol, phenylphenol, catechol, t-butylcatechol, hydroquinone, xylenol and cresol are more preferable.

In the present invention, using a mixture of a compound having sulfo group and a compound having phenolic hydroxyl group as the organic acid means using a mixture of at least one compound having sulfo group and at least one compound having phenolic hydroxyl group as the organic acid. As the compound having sulfo group, aromatic compounds are preferable. The ratio [(I)/(II)] of the amount by weight of the compound having sulfo group (I) and the amount by weight of the compound having phenolic hydroxyl group (II) is not particularly limited. When storage stability of the pretreatment liquid for tinting and a sustained effect of the pretreatment for tinting are considered, the ratio [(I)/(II)] is preferably 0.001 or more and 100 or less, more preferably 0.005 or more and 50 or less, still more preferably 0.005 or more and 10 or less and most preferably 0.01 or more and 2.0 or less.

In the present invention, tinting of the resin for optical materials is conducted after the resin has been dipped into the inorganic acid and/or the organic acid or the liquid containing the inorganic acid and/or the organic acid at a temperature of −50 to 200° C. This treatment of dipping is the pretreatment for tinting and the liquid used for the treatment is the pretreatment liquid for tinting. A resin which is hardly tinted can be easily tinted after this pretreatment. The temperature of the pretreatment liquid is not particularly limited as long as the effect of facilitating tinting can be obtained. The temperature is preferably −20 to 200° C. and more preferably 0 to 150° C. When the temperature is lower than the above range, the pretreatment for tinting becomes insufficient. When the temperature is higher than the above range, deformation of the material takes place. Therefore, such temperatures are not preferable. The time of the dipping is not particularly limited as long as the effect of facilitating tinting can be obtained. The time is generally 1 second to 24 hours, preferably 10 seconds to 10 hours and more preferably 10 seconds to 5 hours. When the time of dipping is shorter than the above range, the effect of the pretreatment becomes insufficient and satisfactory tinting cannot be achieved. When the time is longer than the above range, deformation of the material takes place and a rough surface is formed. Therefore, such times are not preferable. It is preferable that the pretreatment liquid for tinting is stirred to reduce uneven tinting.

The pretreatment for tinting is conducted by dipping the resin for optical materials into the pretreatment liquid for tinting after the resin has been cured by polymerization. From the standpoint of enhancing the effect of pretreatment for tinting and achieving excellent tinting without uneven tinting, it is preferable that the resin for optical materials are cleaned before or after the dipping, where necessary. When tinting is conducted using the resin to which the pretreatment liquid for tinting remains attached, uneven tinting tends to take place and the tinting liquid is contaminated. Therefore, a cleaning operation is necessary after the resin is dipped into the pretreatment liquid for tinting. The cleaning liquid is not particularly limited as long as the cleaning liquid can dissolve components of the pretreatment liquid for tinting. Water, an aqueous solution of an alkali, an aqueous solution of an acid or an organic solvent is generally used as the cleaning liquid. Preferable examples of the cleaning liquid include water, aqueous solutions of alkali metals and alkaline earth metals such as aqueous solutions of sodium hydroxide and aqueous solutions of potassium hydroxide; alcohols such as isopropyl alcohol, ethylene glycol and diethylene glycol; ethers such as 1,4-dioxane; halogenated hydrocarbons such as dichloromethane; amines such as N,N-dimethylformamide, diethylethanolamine and methyldiethanolamine; and dimethylsulfoxide. Any of the above cleaning liquids may be used singly or in combination of two or more. However, it is preferable that cleaning is conducted using an organic solvent and an aqueous solvent alternately. For example, cleaning with an organic solvent may be conducted after cleaning with an aqueous solvent or cleaning with an aqueous solvent may be conducted after cleaning with an organic solvent. It is preferable that cleaning with pure water is conducted as the final step of the cleaning. The temperature of cleaning is preferably –20 to 200° C. and more preferably 0 to 150° C. When the temperature of cleaning is lower than the above range, the effect of cleaning becomes insufficient. When the temperature of cleaning is higher than the above range, deformation of the material takes place. Therefore, such temperatures are not preferable. The time of cleaning is not particularly limited as long as the pretreatment liquid for tinting can be removed. The time is generally 1 second to 24 hours, preferably 10 seconds to 10 hours and more preferably 10 seconds to 5 hours. When the time is shorter than the above range, the effect of cleaning becomes insufficient. When the time is longer than the above range, deformation of the material takes place and a rough surface is formed. Therefore, such times are not preferable. To enhance the effect of cleaning, it is preferable that a surfactant is added to the cleaning liquid and the cleaning is conducted using a stirring apparatus or an ultrasonic cleaning apparatus.

The tinting is generally conducted by heating a liquid composition, which is prepared by adding a dye and a surfactant or a carrier compound, where necessary, to water, at a temperature of the room temperature to 200° C. and then dipping the material for tinting into the prepared liquid composition. The amount of the dye used for preparing the liquid composition is 0.01 to 100 g, preferably 0.05 to 50 g and more preferably 0.1 to 25 g per one liter of water. When the amount of the dye is less than 0.01 g, the time of tinting increases and sufficient tint performance cannot be exhibited. When the amount of the dye exceeds 100 g, dispersion of the dye becomes difficult to cause agglomeration of the dye. This affects the tint performance adversely and uneven tinting takes place. As the dye, commercial dyes which are conventionally used in the field of the present invention such as disperse dyes, reactive dyes, cation dyes, basic dyes, acidic dyes, sulfide dyes and in-grain dyes can be used. However, any other dyes may be used as long as the desired effects can be exhibited. Examples of such dyes include disperse dyes such as DIANIX-YELLOW, -ORANGE, -SCARLET, -RED, -PINK, -VIOLET, -BLUE, -GRAY and -BLACK; reactive dyes such as REMAZOL-YELLOW, -RED, -BLUE, -GRAY and -BLACK; and cation dyes such as ASTRAZON-YELLOW, -RED, -VIOLET, -BLUE, -GREEN and -BLACK (all trade names, manufactured by DYESTAR JAPAN Co., Ltd.). The above dyes may be used as a mixture of several types in accordance with the application.

The surfactant is occasionally necessary. When the surfactant is necessary, the surfactant is generally used in an amount of 0.001 to 50 g, preferably 0.005 to 50 g per one liter of water. When the amount of the surfactant is less than 0.001 g, the effect is not sufficiently exhibited. When the amount exceeds 50 g, uniform tinting becomes difficult. Examples of the surfactant include anionic surfactants such as salts of alkylbenzenesulfonic acids, salts of alkylnaphthalenesulfonic acids, salts of alkylsulfosuccinic acid, condensation products of aromatic sulfonic acids and formalin and salts of laurylsulfuric acid; and nonionic surfactants such as polyoxyethylene alkyl ethers, alkylamine ethers and polyoxyethylene sorbitan fatty acid esters.

The carrier compound is occasionally necessary. When the carrier compound is necessary, the amount of the carrier is generally 0.001 to 50 g and preferably 0.005 to 50 g per one liter of water. When the amount of the carrier compound is less than 0.001 g, the effect of the carrier compound is not sufficiently exhibited. When the amount exceeds 50 g, uniform tinting becomes difficult. As the carrier compound, aromatic compounds are typically used. However, the carrier compound is not particularly limited as long as the desired effect is exhibited. Examples of the carrier compound include compounds described in "Senshoku Kako Kogaku Gairon (Introduction to Tinting Engineering)" published by SEN'I KENKYUSHO Co., Ltd., pages 205 and 286, which are aromatic compounds having phenolic hydroxyl group such as phenol, cresol, naphthol, resorcinol, catechol, bisphenol A, pyrogallol and phloroglucinol; alcohols such as methanol, ethanol, benzyl alcohol, phenetyl alcohol, ethylene glycol, glycerol and xylylenediol; esters such as esters of benzoic acid, esters of salicylic acid, monoesters and diesters of phthalic acid, monoesters and diesters of isophthalic acid and monoesters and diesters of terephthalic acid; and aromatic compounds such as alkylbenzenes, chlorobenzene, dichlorobenzenes, styrene, naphthalene, α-alkylnaphthalenes, β-alkylnaphthalenes, α-vinylnaphthalene and β-vinyl napthalene. The above compounds may be used as a suitable mixture of two or more compounds, where necessary.

The temperature of tinting is not particularly limited as long as the effect of tinting can be exhibited. The temperature is preferably 20 to 200° C. and more preferably 20 to 150° C. When the temperature is lower than the above range, tinting becomes insufficient. When the temperature exceeds the above range, deformation of the material takes place. Therefore, such temperatures are not preferable. Depending on the components of the liquid, occasionally, the desired temperature cannot be obtained by the ordinary heating. In this case, the desired temperature for tinting is achieved by application of a pressure or by adding a component which raises the boiling point, i.e., in accordance with the process of boiling point elevation. When the boiling point is raised by application of a pressure, the tinting is generally conducted at a pressure of 1.1 to 20 atm using a pressure-resistant vessel or an autoclave. When the desired temperature is achieved in accordance with the process of boiling point elevation and, for example, when the tinting liquid is based on water, an inorganic salt or an organic compound soluble in water which exhibits the effect of the molar boiling point elevation is used as the component for boiling point elevation which is added to the tinting liquid. The inorganic salt is not particularly limited as long as the salt is a conventional inorganic salt soluble in water such as calcium chloride and potassium iodide. The organic compound soluble in water is not particularly limited as long as the organic compound is a conventional organic compound soluble in water such as urea and sodium acetate.

The time of dipping into the tinting liquid is not particularly limited as long as the desired effect of tinting can be exhibited. The time is generally 1 second to 10 hours and preferably 5 seconds to 5 hours. When the time is less than the above range, the tinting becomes insufficient. When the time exceeds the above range, deformation of the material takes place. Therefore such times are not preferable. In order to enhance the effect of tinting, it is preferable the tinting liquid is stirred.

In accordance with the process of the present invention, i.e., the process comprising the pretreatment for tinting, the resin for optical materials which is hardly tinted, particularly the resin containing sulfur which is more hardly tinted and more particularly the resin containing a large amount of sulfur which is most hardly tinted to a dense tint in accordance with conventional processes can be tinted to a dense tint. Thus, the resin for optical materials which is tinted to a dense tint and has a high refractive index can be obtained.

By using the resin for optical materials which is obtained by curing by polymerization of the compounds having one or more structures represented by formula (1') or a composition comprising 10% by weight or more of the compound, an Abbe number of 30 or larger and a refractive index higher than those of conventional optical materials, i.e., a refractive index of 1.72 or larger, can be achieved.

EXAMPLES

The present invention will be described more specifically with reference to examples in the following. However, the present invention is not limited to the examples. The tinting of a resin was conducted in accordance with the following method.

The method of tinting: a resin was dipped into a tinting liquid having the following composition at 90° C. for 5 minutes.

Composition of the Tinting Liquid (Water as the Solvent)

| | |
|---|---|
| SEIKO PRAX DIACOAT BROWN D | 0.2% by weight |
| SEIKO PRAX auxiliary tinting agent | 0.3% by weight |
| benzyl alcohol | 2.0% by weight |

After the resin was tinted, the total light transmittance of the resin was measured and the tint performance was obtained in accordance with the following equation:

$$\text{tint performance} = 100 \text{ total light transmittance } (\%)$$

Example 1

A lens (a flat plate having a thickness of 2.5 mm) prepared by curing by polymerization of bis(β-epithiopropyl)sulfide was dipped into sulfuric acid at 30° C. for 30 minutes as the pretreatment for tinting and thereafter tinted. The tinted lens showed uniform tinting and an excellent condition without deformation. The tint performance of the obtained lens is shown in Table 1.

Example 2

The same procedures as those conducted in Example 1 were conducted except that, before the tinting, the pretreatment for tinting was conducted by dipping the lens into the pretreatment liquid for tinting shown in Table 1 in the condition shown in Table 1 in place of dipping the lens into sulfuric acid at 30° C. for 30 minutes. The tint performance of the obtained lens is shown in Table 1.

Examples 3 to 54

The same procedures as those conducted in Example 1 were conducted except that lenses prepared from the compositions shown in Table 1 in place of bis(β-epithiopropyl) sulfide were dipped into the pretreatment liquids for tinting shown in Table 1 in the conditions shown in Table 1. The tint performance of the obtained lenses is shown in Table 1.

Comparative Examples 1 to 14

Lenses were prepared from the compositions shown in Table 2 and tinted without any pretreatment for tinting. The tint performance of the obtained lenses is shown in Table 2.

Comparative Example 15

The same procedures as those conducted in Example 1 were conducted except that the pretreatment for tinting was conducted by dipping into liquid paraffin at 120° C. for 60 minutes in place of dipping into concentrated sulfuric acid at 20° C. for 30 minutes. The tint performance of the obtained lens is shown in Table 2.

Examples 55 to 69

Lenses were prepared from the compositions shown in Table 1, pretreated for tinting in the conditions shown in Table 1 with the pretreatment liquids for tinting shown in Table 3 on the day when the pretreatment liquids were prepared (0 days), 10 days after the pretreatment liquids were prepared or 30 days after the pretreatment liquids were prepared and thereafter tinted. The tint performance of the obtained lenses is shown in Table 3.

Comparative Examples 16 to 30

Lenses were prepared from the compositions shown in Table 4, pretreated for tinting in the conditions shown in Table 4 with the pretreatment liquids for tinting shown in Table 4 on the day when the pretreatment liquids were prepared (0 days), 10 days after the pretreatment liquids were prepared or 30 days after the pretreatment liquids were prepared and thereafter tinted. The tint performance of the obtained lenses is shown in Table 4.

The compositions of resins A to V shown in Tables 1 to 4 were as follows:

A: bis(β-epithiopropyl)sulfide
B: bis(β-epithiopropyl)sulfide/n-butyl thioglycolate=95/5
C: bis(β-epithiopropyl)sulfide/2-mercaptothanol=95/5
D: bis(β-epithiopropyl)sulfide/bis(2-mercaptoethyl) sulfide=95/5
E: bis(β-epithiopropyl)sulfide/n-butyl thioglycolate/2-mercaptoethanol=94.5/2.5/3
F: bis(β-epithiopropyl)sulfide/n-butyl thioglycolate/2-hydroxyethyl methacrylate=93/6/1
G: bis(β-epithiopropyl)sulfide/bis(2-mercaptoethyl) sulfide/2-hydroxyethyl methacrylate=90/5/5
H: bis(β-epithiopropyl)sulfide/bis(2-mercaptoethyl) sufide/ 3-phenoxy-2-hydroxypropyl acrylate=90/5/5
I: bis(β-epithiopropyl)sulfide/bis(2-mercaptoethyl) sulfide/glycidol=92/5/3
J: bis(β-epithiopropyl)disulfide
K: bis(β-epithiopropyl)disulfide/n-butyl thioglycolate=95/5
L: bis(β-epithiopropyl)disulfide/2-mercaptoethanol=95/5
M: bis(β-epithiopropyl)disulfide/bis(2-mercaptoethyl) sulfide=95/5
N: bis(β-diepithiopropyl)sulfide
O: bis(β-diepithiopropyl)disulfide
P: bis(β-epithiopropyl)trisulfide
Q: bis(β-epithiopropyl)ethyl ether
R: 2,5-bis(mercaptomethyl)-1,4-dithiane/1,3-bis (isocyanatomethyl)cyclohexane=54/48
S: bis(mercaptoethyl)trithioglycerol/m-xylylene diisocyanate=48/52
T: bis(mercaptoethyl)trithioglycerol/ dicyclohexylmethane 4,4'-diisocyanate=40/60
U: pentaerythritol tetrakis-3-mercaptopropionate/m-xylylene diisocyanate=56/44
V: diethylene glycol bisallyl carbonate The compositions of pretreatment liquids for tinting a to h shown in Tables 3 and 4 were as follows:

a: m-xylylenesulfonic acid/3,5-xylenol/naphthalene=50/25/25
b: m-xylylenesulfonic acid/3,5-xylenol/naphthalene=60/20/20
c: sulfuric acid/p-toluenesulfonic acid/catechol=85/10/5
d: sulfuric acid/p-toluenesulfonic acid/catechol=75/20/5
e: phenolsulfonic acid/catechol/o-phenylphenol=5/10/85
f: phenolsulfonic acid/catechol/o-phenylphenol=80/10/10
g: benzenesulfonic acid/o-phenylphenol=5/95
h: benzenesulfonic acid/o-phenylphenol=90/10

The amounts of components in the above resins and in the above pretreatment liquids for tinting are expressed as ratios by weight. The compositions of the pretreatment liquids for tinting in Table 1 are also expressed as ratios by weight.

TABLE 1-1

| Example | Resin | Content of sulfur (%) | composition of pretreatment liquid for tinting | temperature (° C.) | time (min) | Tint performance (%) |
|---|---|---|---|---|---|---|
| 1 | A | 54 | sulfuric acid | 30 | 30 | 90 |
| 2 | A | 54 | 30% hypophosphorous acid | 20 | 120 | 70 |
| 3 | B | 52 | 35% hydrochloric acid | 30 | 120 | 75 |
| 4 | B | 52 | ethylsulfonic acid | 70 | 30 | 70 |
| 5 | C | 53 | 60% nitric acid | 20 | 30 | 90 |
| 6 | C | 53 | benzenesulfonic acid/catechol/o-phenylphenol = 10/10/80 | 90 | 30 | 90 |
| 7 | D | 54 | 85% phosphoric acid | 20 | 30 | 75 |
| 8 | D | 54 | sulfuric acid/p-toluenesulfonic acid = 90/10 | 90 | 10 | 90 |
| 9 | E | 53 | benzenesulfonic acid/catechol = 50/50 | 90 | 30 | 85 |
| 10 | F | 51 | m-xylenesulfonic acid/3,5-xylenol/naphthalene = 60/20/20 | 90 | 30 | 80 |
| 11 | F | 51 | sulfuric acid/p-toluenesulfonic acid/phenolsulfonic acid = 50/25/25 | 90 | 30 | 90 |
| 12 | G | 52 | phenolsulfonic acid/o-phenylphenol = 5/95 | 90 | 30 | 80 |
| 13 | G | 52 | sulfuric acid/acetic acid = 80/20 | 30 | 10 | 80 |
| 14 | H | 52 | phenolsulfonic acid/catechol/o-phenylphenol = 5/10/85 | 90 | 30 | 85 |
| 15 | H | 52 | phenolsulfonic acid/catechol/o-phenylphenol = 10/10/80 | 90 | 30 | 85 |
| 16 | I | 53 | sulfuric acid/p-toluenesulfonic acid/catechol = 80/10/10 | 90 | 10 | 90 |
| 17 | I | 53 | sulfuric acid/p-toluenesulfonic acid/catechol = 85/10/5 | 90 | 10 | 90 |
| 18 | I | 53 | benzenesulfonic acid/o-phenylphenol = 5/95 | 90 | 30 | 80 |
| 19 | J | 61 | sulfuric acid | 30 | 30 | 80 |
| 20 | J | 61 | phenolsulfonic acid/catechol/o-phenylphenol = 5/10/85 | 90 | 30 | 80 |
| 21 | J | 61 | phenolsulfonic acid/catechol/o-phenylphenol = 5/10/85 | 90 | 30 | 80 |

TABLE 1-2

| Example | Resin | Content of sulfur (%) | composition of pretreatment liquid for tinting | temperature (° C.) | time (min) | Tint performance (%) |
|---|---|---|---|---|---|---|
| 22 | K | 59 | benzenesulfonic acid/catechol/o-phenylphenol = 10/10/80 | 90 | 30 | 80 |
| 23 | K | 59 | sulfuric acid/p-toluenesulfonic acid = 90/10 | 90 | 10 | 85 |
| 24 | L | 50 | benzenesulfonic acid/catechol = 50/50 | 90 | 30 | 80 |
| 25 | L | 60 | m-xylenesulfonic acid/35-xylenol/naphthalene = 50/25/25 | 90 | 30 | 80 |
| 26 | L | 60 | sulfuric acid/p-toluenesulfonic acid/phenolsulfonic acid = 80/10/10 | 90 | 10 | 90 |
| 27 | M | 61 | phenolsulfonic acid/o-phenylphenol = 5/95 | 90 | 30 | 85 |
| 28 | N | 66 | 30% hypophosphorous acid | 20 | 120 | 60 |
| 29 | O | 70 | sulfuric acid/p-toluenesulfonic acid/catechol = 80/10/10 | 90 | 10 | 90 |
| 30 | P | 66 | sulfuric acid/p-toluenesulfonic acid/catechol = 85/10/5 | 90 | 10 | 90 |
| 31 | P | 66 | benzensulfonic acid/o-phenylphenol = 5/95 | 90 | 30 | 90 |
| 32 | Q | 31 | sulfuric acid | 30 | 30 | 95 |
| 33 | R | 32 | 30% hypophosphorous acid | 20 | 120 | 50 |
| 34 | R | 32 | phenolsulfonic acid/o-phenylphenol = 9/95 | 90 | 30 | 85 |
| 35 | R | 32 | benzenesulfonic acid/catechol/o-phenylphenol = 5/10/85 | 90 | 30 | 85 |
| 36 | R | 32 | sulfuric acid/p-toluenesulfonic acid/catechol = 85/10/5 | 90 | 10 | 80 |
| 37 | S | 30 | sulfuric acid | 30 | 30 | 95 |
| 38 | S | 30 | benzenesulfonic acid/o-phenylphenol = 5/95 | 90 | 30 | 85 |
| 39 | S | 30 | sulfuric acid/p-toluenesulfonic acid = 90/10 | 90 | 10 | 85 |
| 40 | S | 30 | m-xylenesulfonic acid/3,5-xylenol/naphthalene = 50/25/25 | 90 | 30 | 85 |

TABLE 1-3

| Example | Resin | Content of sulfur (%) | composition of pretreatment liquid for tinting | temperature (° C.) | time (min) | Tint performance (%) |
|---|---|---|---|---|---|---|
| 41 | T | 25 | 30% hypophosphorous acid | 20 | 120 | 50 |
| 42 | T | 25 | phenolsulfonic acid/o-phenylphenol = 5/95 | 90 | 30 | 90 |
| 43 | T | 25 | benzensulfonic acid/catechol/o-phenylphenol = 5/10/85 | 90 | 30 | 90 |
| 44 | T | 25 | m-xylenesulfonic acid/3,5-xylenol/naphthalene = 50/25/25 | 90 | 30 | 70 |
| 45 | U | 15 | sulfuric acid | 30 | 30 | 90 |
| 46 | U | 15 | benzenesulfonic acid/o-phenylphenol = 5/95 | 90 | 30 | 90 |
| 47 | U | 15 | sulfuric acid/p-toluenesulfonic acid = 90/10 | 90 | 10 | 95 |
| 48 | U | 15 | sulfuric acid/p-toluenesulfonic acid/catechol = 85/10/5 | 90 | 10 | 95 |
| 49 | V | 0 | 30% hypophosphorous acid | 20 | 120 | 70 |
| 50 | V | 0 | sulfuric acid | 30 | 30 | 95 |
| 51 | V | 0 | phenolsulfonic acid/o-phenylphenol = 5/95 | 90 | 30 | 85 |
| 52 | V | 0 | sulfuric acid/p-toluenesulfonic acid = 90/10 | 90 | 10 | 90 |
| 53 | V | 0 | sulfuric acid/p-toluenesulfonic acid/catechol = 85/10/5 | 90 | 10 | 90 |
| 54 | V | 0 | m-xylenesulfonic acid/3,5-xylenol/naphthalene = 50/25/25 | 90 | 30 | 90 |

TABLE 2

| Comparative Example | Resin | Content of sulfur (%) | Pretreatment for tinting pretreatment liquid for tinting | temperature (° C.) | time (min) | Tint performance (%) |
|---|---|---|---|---|---|---|
| 1 | A | 54 | none | — | — | 15 |
| 2 | B | 52 | none | — | — | 20 |
| 3 | H | 52 | none | — | — | 20 |
| 4 | J | 61 | none | — | — | 15 |
| 5 | M | 61 | none | — | — | 20 |
| 6 | N | 66 | none | — | — | 15 |
| 7 | O | 70 | none | — | — | 15 |
| 8 | P | 66 | none | — | — | 15 |
| 9 | Q | 31 | none | — | — | 25 |
| 10 | R | 32 | none | — | — | 25 |
| 11 | S | 30 | none | — | — | 30 |
| 12 | T | 25 | none | — | — | 45 |
| 13 | U | 15 | none | — | — | 45 |
| 14 | V | 0 | none | — | — | 65 |
| 15 | A | 54 | liquid paraffin | 120 | 60 | 15 |

TABLE 3

| Example | Resin | Content of sulfur (%) | composition of pretreatment liquid | (I) (II) | temperature (° C.) | time (min) | Tint performance 0 days (%) | 10 days (%) | 30 days (%) |
|---|---|---|---|---|---|---|---|---|---|
| 55 | F | 51 | a | 2.0 | 90 | 30 | 80 | 80 | 80 |
| 56 | L | 60 | a | 2.0 | 90 | 30 | 80 | 80 | 80 |
| 57 | S | 30 | a | 2.0 | 90 | 30 | 85 | 85 | 85 |
| 58 | T | 25 | a | 2.0 | 90 | 30 | 70 | 70 | 70 |
| 59 | V | 0 | a | 2.0 | 90 | 30 | 90 | 90 | 90 |
| 60 | I | 53 | c | 2.0 | 90 | 10 | 90 | 90 | 90 |
| 61 | O | 70 | c | 2.0 | 90 | 10 | 90 | 90 | 90 |
| 62 | R | 32 | c | 2.0 | 90 | 10 | 80 | 80 | 80 |
| 63 | U | 15 | c | 2.0 | 90 | 10 | 95 | 95 | 95 |
| 64 | V | 0 | c | 2.0 | 90 | 10 | 90 | 90 | 90 |
| 65 | H | 52 | e | 0.05 | 90 | 30 | 85 | 85 | 85 |
| 66 | J | 61 | e | 0.05 | 90 | 30 | 80 | 80 | 80 |
| 67 | P | 66 | g | 0.05 | 90 | 30 | 90 | 90 | 90 |
| 68 | S | 30 | g | 0.05 | 90 | 30 | 85 | 85 | 85 |
| 69 | U | 15 | g | 0.05 | 90 | 30 | 90 | 90 | 90 |

TABLE 4

| Comparative Example | Resin | Content of sulfur (%) | composition of pretreatment liquid | (I) (II) | temperature (° C.) | time (min) | Tint performance 0 days (%) | 10 days (%) | 30 days (%) |
|---|---|---|---|---|---|---|---|---|---|
| 16 | F | 51 | b | 3.0 | 90 | 30 | 80 | 75 | 66 |
| 17 | L | 60 | b | 3.0 | 90 | 30 | 80 | 75 | 65 |
| 18 | S | 30 | b | 3.0 | 90 | 30 | 85 | 80 | 75 |
| 19 | T | 25 | b | 3.0 | 90 | 30 | 75 | 65 | 60 |
| 20 | V | 0 | b | 3.0 | 90 | 30 | 85 | 75 | 70 |
| 21 | I | 53 | d | 4.0 | 90 | 10 | 90 | 90 | 75 |
| 22 | O | 70 | d | 4.0 | 90 | 10 | 90 | 90 | 75 |
| 23 | R | 32 | d | 4.0 | 90 | 10 | 85 | 80 | 70 |
| 24 | U | 15 | d | 4.0 | 90 | 10 | 90 | 85 | 70 |
| 25 | V | 0 | d | 4.0 | 90 | 10 | 90 | 85 | 85 |
| 26 | H | 52 | f | 4.0 | 90 | 30 | 85 | 85 | 65 |
| 27 | J | 61 | f | 4.0 | 90 | 30 | 85 | 80 | 65 |
| 28 | P | 66 | h | 9.0 | 90 | 30 | 90 | 90 | 80 |
| 29 | S | 30 | h | 9.0 | 90 | 30 | 90 | 90 | 80 |
| 30 | U | 15 | h | 9.0 | 90 | 30 | 90 | 90 | 80 |

Examples in which the resins for optical materials obtained by curing by polymerization of the compounds having one or more structures represented by formula (1') were used will be specifically described in the following. The obtained lenses were evaluated in accordance with the following methods:

1. Refractive Index and Abbe Number (ND and vD, Respectively)

The refractive index and the Abbe number were measured at 25° C. using an Abbe refractometer.

2. Specific Gravity

The specific gravity was measured at 25° C. using an electronic specific gravity meter.

Reference Example 1

(Preparation of bis(β-epithiopropyl)disulfide)

β-Epithiopropylmercaptan which was prepared in accordance with a conventional method described in references (for example, F. P. Doyl et al. J. Chem. Soc. 1960, 2660) in an amount of 265.5 g (2.5 mol) and 1 liter of methanol were placed into a beaker. Into the beaker, a solution prepared by dissolving 675.8 g (2.5 mol) of iron(III) chloride hexahydrate into 1 liter of methanol was added and the mixture was vigorously stirred. The mixture was further stirred at the room temperature for 6 hours. The supernatant liquid was then removed by decantation. The obtained oil portion was washed with water and low boiling components were removed in vacuo at the room temperature. The obtained product was pure bis(β-epithiopropyl)disulfide as shown by the following results of analyses.

Elemental analysis:

| Element | Found (%) | Calculated (%) |
|---|---|---|
| C | 34.01 | 34.25 |
| H | 4.95 | 4.75 |
| S | 60.70 | 60.96 |

Mass spectrum (EI): M$^+$210 (calculated: 210)

Infrared absorption spectrum: 620 cm$^{-1}$ (stretching vibration of the episulfide ring)

| | |
|---|---|
| $^1$H-NMR | 3.2 ppm (m, 4H) |
| | 2.7 ppm (m, 2H) |
| | 2.6 ppm (m, 2H) |
| | 2.4 ppm (m, 2H) |
| $^{13}$C-NMR | 45.6 ppm |
| | 33.5 ppm |
| | 26.1 ppm |

Example 70

To 100 parts by weight of bis(β-epithiopropyl)disulfide, 1.0 part by weight of triphenylphosphine as the catalyst was mixed and the mixture was stirred at the room temperature to obtain a homogenous liquid. The obtained liquid was defoamed, filtered and then cast into flat molds for lenses having a thickness of 2.5 mm and a thickness of 10 mm. The molds containing the liquid was heated in an oven by raising the temperature from 20° C. to 90° C. over 20 hours and the resin was cured by polymerization to prepare lenses. The obtained lenses had excellent heat resistance and physical properties and showed an excellent surface condition with little striae or surface deformation. The results of the measurements of the refractive index, the Abbe number and the specific gravity of the prepared lenses are shown in Table 5.

The prepared lenses were pretreated for tinting and tinted in the same condition as that in Example 14. The tinted lenses showed uniform tinting and excellent surface conditions without surface deformation. The tint performance of the obtained lenses is shown in Table 5.

Examples 71 to 77

The same procedures as those conducted in Example 70 were conducted except that the compounds having structures represented by formula (1') or the compositions containing the compounds, which are show in Table 5, were used in place of bis(β-epithiopropyl)disulfide used in Example 70. The results of the measurements of the refractive index, the Abbe number, the specific gravity and the tint performance of the obtained lenses are shown in Table 5.

TABLE 5

| Example | Composition, parts by weight | Refractive index | Abbe number | Specific gravity | Tint performance (%) |
|---|---|---|---|---|---|
| 70 | bis(β-epithiopropyl) disulfide = 100 | 1.73 | 34 | 1.46 | 85 |
| 71 | bis(β-epithiopropyl) trisulfide = 100 | 1.75 | 32 | 1.51 | 80 |
| 72 | bis(β-epidithiopropyl) sulfide = 100 | 1.75 | 32 | 1.52 | 80 |
| 73 | bis(β-epidithiopropyl) disulfide 100 | 1.76 | 31 | 1.58 | 75 |
| 74 | bis(β-epidithiopropyl) disulfide = 30 bis(β-epithiopropyl) sulfide = 70 | 1.73 | 34 | 1.45 | 85 |
| 75 | 1,1,1-tri(β-epidithiopropylthiomethyl)-propane = 100 | 1.73 | 34 | 1.46 | 80 |
| 76 | tetrakis(β-epithiopropyldithiomethyl)-methane | 1.74 | 33 | 1.48 | 80 |
| 77 | 2,5-bis(β-epithiopropyldithiomethyl)-1,4-dithiane = 100 | 1.73 | 34 | 1.47 | 80 |

What is claimed is:

1. A process for tinting a resin, containing sulfur, for optical materials, comprising dipping said resin containing sulfur for optical materials into a liquid comprising an organic acid and thereafter tinting said resin, wherein the organic acid is a mixture of a first compound (I) having sulfo group and a second compound (II) having phenolic hydroxyl group but not having sulfo group, and a ratio (I/II) of an amount by weight of compound (I) to an amount by weight of compound (II) is 0.01 to 2.0, and wherein the resin for optical materials, containing sulfur, is a resin obtained by curing by polymerization of a compound having one or more structures represented by formula (1) in one molecule or a composition comprising said compound, formula (1) being:

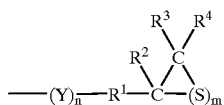

(1)

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents S or O, m represents a number of 2 to 5 and n represents a number of 0 to 5.

2. A process according to claim 1, wherein the resin contains at least 30% by weight sulfur of the total weight of the resin.

3. A process according to claim 1, wherein the resin is subjected to cleaning after said dipping and prior to said tinting.

4. A process according to claim 1, consisting essentially of said dipping and said tinting.

* * * * *